United States Patent
Karve et al.

(10) Patent No.: US 9,489,231 B2
(45) Date of Patent: *Nov. 8, 2016

(54) SELECTING PROVISIONING TARGETS FOR NEW VIRTUAL MACHINE INSTANCES

(71) Applicant: International Business Machines Corporation, Armonk, NY (US)

(72) Inventors: Alexei Karve, Mohegan Lake, NY (US); Andrzej Kochut, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,748

(22) Filed: Jun. 16, 2015

(65) Prior Publication Data

US 2015/0277961 A1    Oct. 1, 2015

Related U.S. Application Data

(63) Continuation of application No. 13/566,460, filed on Aug. 3, 2012, now Pat. No. 9,135,040.

(51) Int. Cl.
*G06F 9/455* (2006.01)
*G06F 9/50* (2006.01)

(52) U.S. Cl.
CPC ....... *G06F 9/45558* (2013.01); *G06F 9/45545* (2013.01); *G06F 9/5077* (2013.01); *G06F 2009/4557* (2013.01); *G06F 2009/45562* (2013.01); *G06F 2009/45583* (2013.01)

(58) Field of Classification Search
CPC .......... G06F 9/45558; G06F 9/45545; G06F 9/5077; G06F 2009/45562; G06F 2009/4557; G06F 2009/45583
See application file for complete search history.

(56) References Cited

U.S. PATENT DOCUMENTS

| | | | |
|---|---|---|---|
| 2009/0070771 A1* | 3/2009 | Yuyitung | G06Q 10/06 718/105 |
| 2010/0169881 A1 | 7/2010 | Silvera et al. | |
| 2010/0180275 A1 | 7/2010 | Neogi et al. | |
| 2010/0242045 A1 | 9/2010 | Swamy et al. | |
| 2011/0214123 A1 | 9/2011 | Lublin et al. | |
| 2011/0219372 A1* | 9/2011 | Agrawal | G06F 9/45558 718/1 |
| 2011/0225277 A1* | 9/2011 | Freimuth | G06F 9/45558 709/223 |
| 2011/0265083 A1 | 10/2011 | Davis | |
| 2012/0084445 A1 | 4/2012 | Brock et al. | |

OTHER PUBLICATIONS

Gerofi et al. "Utilizing Memory content Similarity for Improving the Performance of Replicated Virtual Machines" Proceddings of 2011 IEEE 4th International conference on Utility and Cloud Computing (UCC2011; pp. 73-80.

(Continued)

*Primary Examiner* — Lewis A Bullock, Jr.
*Assistant Examiner* — Jacob Dascomb
(74) *Attorney, Agent, or Firm* — Louis Percello (57) ABSTRACT

One embodiment of a system for provisioning a new virtual machine instance on a target host based on an image of the new virtual machine instance includes a local storage for storing images of virtual machine instances currently running on the target host and a virtual machine creator coupled to the local storage for constructing the image of the new virtual machine instance at least in part using the images of virtual machine instances currently running on the target host.

18 Claims, 6 Drawing Sheets

(56) References Cited

OTHER PUBLICATIONS

Lenovo; "Creating Linkage between a Hypervisor's TPM and its Supported VM Virtual TPM Reporting" http://www.ip.com/pubview/IPCOM000147479D, Mar. 16, 2007.

IBM; "Space Optimized Virtual Machine (VM) Image Creation for Desktop Virtualization Solution" http://www.ip.com/pubview/IPCOM000175587D, Oct. 15, 2008.

Anonymously; "Method and System for Faster Deployment of Virtual Machine (VM) Images"; http://www.ip.com/priorartdatabase.com/IPCOM000199680, Sep. 14, 2010.

Kochut et al., "Leveraging Local Image Redundancy for Efficient Virtual Machine Provisioning" Network Operations and Management Symposium, Apr. 16-20, 2012 IEEE, 9 unnumbered pages.

* cited by examiner

| Cluster Identifier | Image Type Identifier ||||||||||| Cluster Size (MB) |
|---|---|---|---|---|---|---|---|---|---|---|---|
| | 1 | 2 | 3 | 4 | 5 | 6 | 7 | 8 | 9 | 10 | |
| CL-01 | 1 | 0 | 0 | 0 | 0 | 0 | 0 | 0 | 0 | 0 | 238 |
| CL-02 | 0 | 1 | 0 | 0 | 0 | 0 | 0 | 0 | 0 | 0 | 314 |
| CL-03 | 0 | 0 | 1 | 0 | 0 | 0 | 0 | 0 | 0 | 0 | 182 |
| CL-04 | 0 | 0 | 0 | 1 | 0 | 0 | 0 | 0 | 0 | 0 | 256 |
| CL-05 | 0 | 0 | 0 | 0 | 1 | 0 | 0 | 0 | 0 | 0 | 476 |
| CL-06 | 0 | 0 | 0 | 0 | 0 | 1 | 0 | 0 | 0 | 0 | 458 |
| CL-07 | 0 | 0 | 0 | 0 | 0 | 0 | 1 | 0 | 0 | 0 | 317 |
| CL-08 | 0 | 0 | 0 | 0 | 0 | 0 | 0 | 1 | 0 | 0 | 358 |
| CL-09 | 0 | 0 | 0 | 0 | 0 | 0 | 0 | 0 | 1 | 0 | 70 |
| CL-10 | 0 | 0 | 0 | 0 | 0 | 0 | 0 | 0 | 0 | 1 | 303 |
| CL-11 | 1 | 0 | 0 | 0 | 1 | 0 | 0 | 0 | 0 | 0 | 419 |
| CL-12 | 0 | 0 | 0 | 1 | 0 | 0 | 1 | 0 | 1 | 0 | 141 |
| CL-13 | 0 | 1 | 0 | 1 | 0 | 0 | 0 | 0 | 0 | 0 | 174 |
| CL-14 | 1 | 0 | 0 | 1 | 0 | 0 | 1 | 0 | 0 | 0 | 187 |
| CL-15 | 0 | 0 | 0 | 0 | 1 | 0 | 1 | 0 | 0 | 0 | 319 |
| CL-16 | 0 | 0 | 0 | 0 | 0 | 0 | 0 | 0 | 1 | 0 | 294 |
| CL-17 | 0 | 1 | 0 | 0 | 0 | 1 | 0 | 0 | 1 | 0 | 440 |
| CL-18 | 0 | 0 | 1 | 1 | 0 | 0 | 0 | 0 | 0 | 0 | 84 |
| CL-19 | 0 | 0 | 0 | 0 | 0 | 0 | 0 | 0 | 0 | 0 | 116 |
| CL-20 | 1 | 0 | 0 | 0 | 0 | 0 | 0 | 0 | 1 | 0 | 260 |

SELECTING PROVISIONING TARGETS FOR NEW VIRTUAL MACHINE INSTANCES

BACKGROUND OF THE INVENTION

The present invention relates generally to cloud computing and relates more specifically to the provisioning of virtual machines in the cloud.

A virtual machine is a software implementation of a machine (e.g., a computer) that executes programs like a physical machine. When a new virtual machine instance is to be provisioned in the cloud containing multiple hypervisor host machines, one must determine which of the host machines is best suited to host the new instance.

Typical placement algorithms identify the best suited host machine based on resource availability at the host machine (e.g., central processing unit, disk, bandwidth, and/or memory availability). For instance, a placement algorithm may divide each host machine into a fixed number of "slots" (i.e., a certain number of cores and memories) and allocate virtual machine instances to free slots (e.g., based on round robin, lowest slot number first, or other allocation schemes).

Once a target host machine is selected, the virtual machine instance is provisioned by first copying the virtual machine image from a storage server to the target host machine. This process consumes network and storage server bandwidth and adds latency to the provisioning process. Notably, virtual machine provisioning time is a key metric of cloud elasticity (i.e., ability to handle sudden, unanticipated, and extraordinary loads), and cost minimization is closely tied to resource usage.

SUMMARY OF THE INVENTION

One embodiment of a system for provisioning a new virtual machine instance on a target host based on an image of the new virtual machine instance includes a local storage for storing images of virtual machine instances currently running on the target host and a virtual machine creator coupled to the local storage for constructing the image of the new virtual machine instance at least in part using the images of virtual machine instances currently running on the target host.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the invention is a method and apparatus for selecting provisioning targets for new virtual machine instances. Embodiments of the invention construct the required image for a new virtual machine instance using a set of local images already stored on the target host machine (i.e., for virtual machine instances already running on the target host machine). This reduces the amount of data that must be copied over the network, since only the portions of the required image that are not already present locally on the target host machine need to be copied. In turn, the amount of time and resources required to provision the new virtual machine instance may be substantially reduced. Thus, a target host machine is selected based at least in part on the similarity between the image of the new virtual machine instance and the images of the virtual machine instances already running on the host machine.

Figure 1:
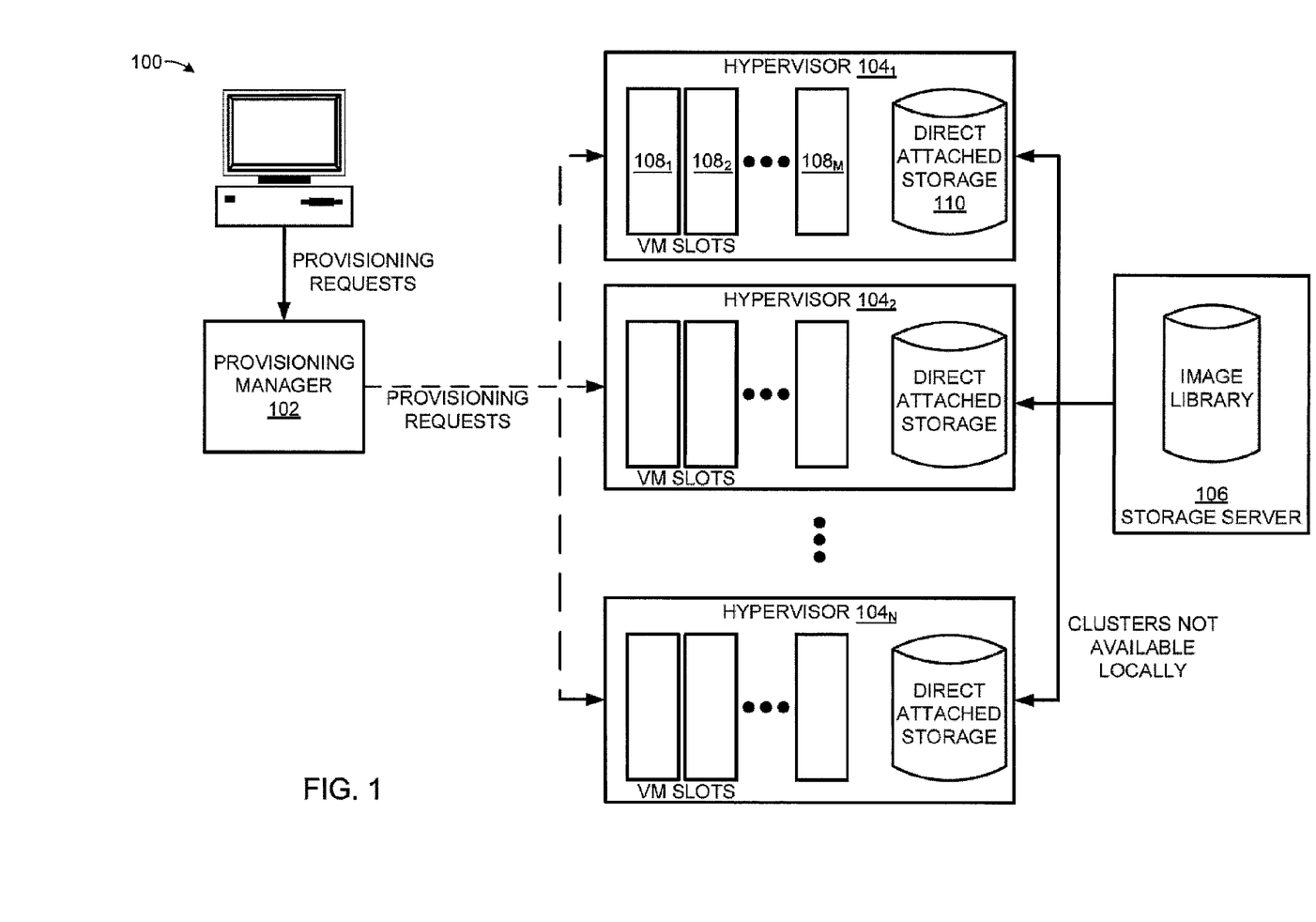
FIG. 1 is a block diagram illustrating one embodiment of a system for selecting provisioning targets for new virtual machine instances, according to the present invention.

FIG. 1 is a block diagram illustrating one embodiment of a system 100 for selecting provisioning targets for new virtual machine instances, according to the present invention. The system 100 is configured to receive requests for the provisioning of new virtual machine instances and to provision those requests by selecting a target host machine (e.g., hypervisor) that is best suited to host the new virtual machine instance based on image similarity. To this end, the system 100 generally comprises a provisioning manager 102, a plurality of hypervisors 104 (hereinafter collectively referred to as "hypervisors 104"), and a storage server 106.

The provisioning manager 102 comprises a processor that receives and allocates provisioning requests. The provisioning manager 102 is in communication with the hypervisors 104 or with agents deployed on the hypervisors 104.

The hypervisors 104 comprise virtual machine managers that allow guest operating systems to be hosted and managed on host computers. For instance, one or more of the hypervisors 104 may be installed on a server. Taking the hypervisor $104_1$ as an example, each hypervisor 104 includes a plurality of slots $108_1$-$108_m$, (hereinafter collectively referred to as "slots 108") and a direct attached storage 110. As discussed above, each of the slots 108 comprises a certain number of cores and memories to be allocated by the hypervisor $104_1$ to virtual machine instances. The direct attached storage 110 contains virtual machine images (i.e., files containing the complete contents and structures representing virtual machine instances) of virtual machine instances currently running on the hypervisor $104_1$. Additional details of the hypervisors 104 are illustrated in FIG. 2.

The hypervisors 104 are further in communication with the storage server 106, which includes an image library. The image library includes virtual machine images for a plurality of virtual machine instances, including the virtual machine instances currently running on each of the hypervisors 104.

Figure 2:
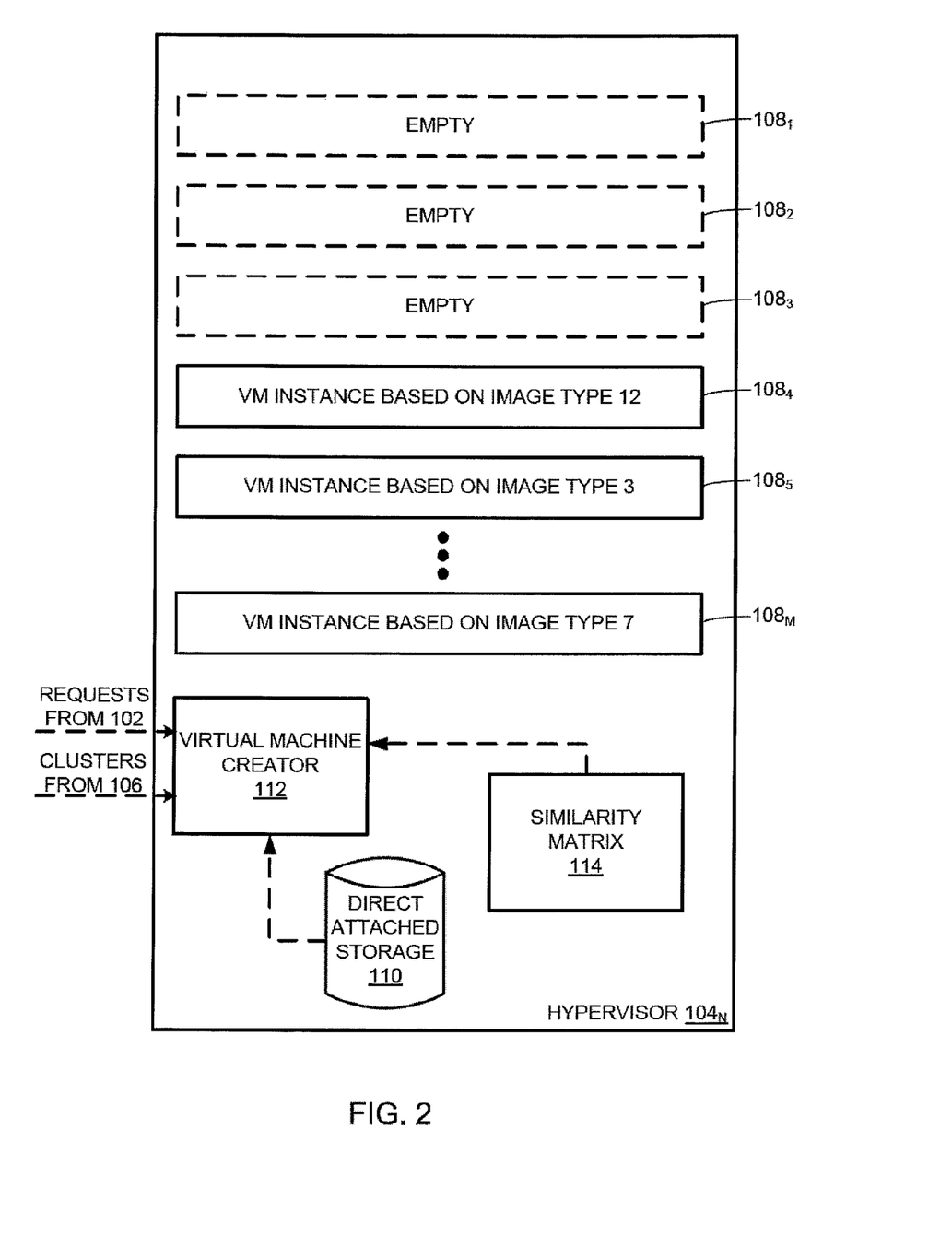
FIG. 2 is a block diagram illustrating an exemplary embodiment of the hypervisor of FIG. 1 in greater detail.

FIG. 2 is a block diagram illustrating an exemplary embodiment of the hypervisor $104_1$ of FIG. 1 in greater detail. As discussed above, the hypervisor 1041 includes a plurality of slots 108 and a direct attached storage 110. In addition, the hypervisor $104_1$ includes a virtual machine creator 112 and a similarity matrix 114.

The virtual machine creator 112 is an agent (e.g., a software agent or a processor) that communicates with the provisioning manager 102 in order to determine whether the hypervisor $104_1$ is best suited to host a new virtual machine instance. The virtual machine creator 112 is also in communication with the storage server 106, the direct attached storage 110, and the similarity matrix 114. The virtual machine creator 112 tracks the images for virtual machine instances running on the hypervisor $104_1$ and constructs the similarity matrix 114. If the hypervisor $104_1$ is selected for the provisioning of the new virtual machine instance, the virtual machine creator 112 cooperates with the provisioning manager 102 to establish the new virtual machine instance.

The similarity matrix 114 tracks information regarding the image types that are available locally to the hypervisor $104_1$, so that a comparison can be made to the image of a new virtual machine instance, as discussed in greater detail below. The virtual machine creator 112 may update the similarity matrix 114 (e.g., periodically, on demand, or in response to a change in the direct attached storage 110).

Figure 3:
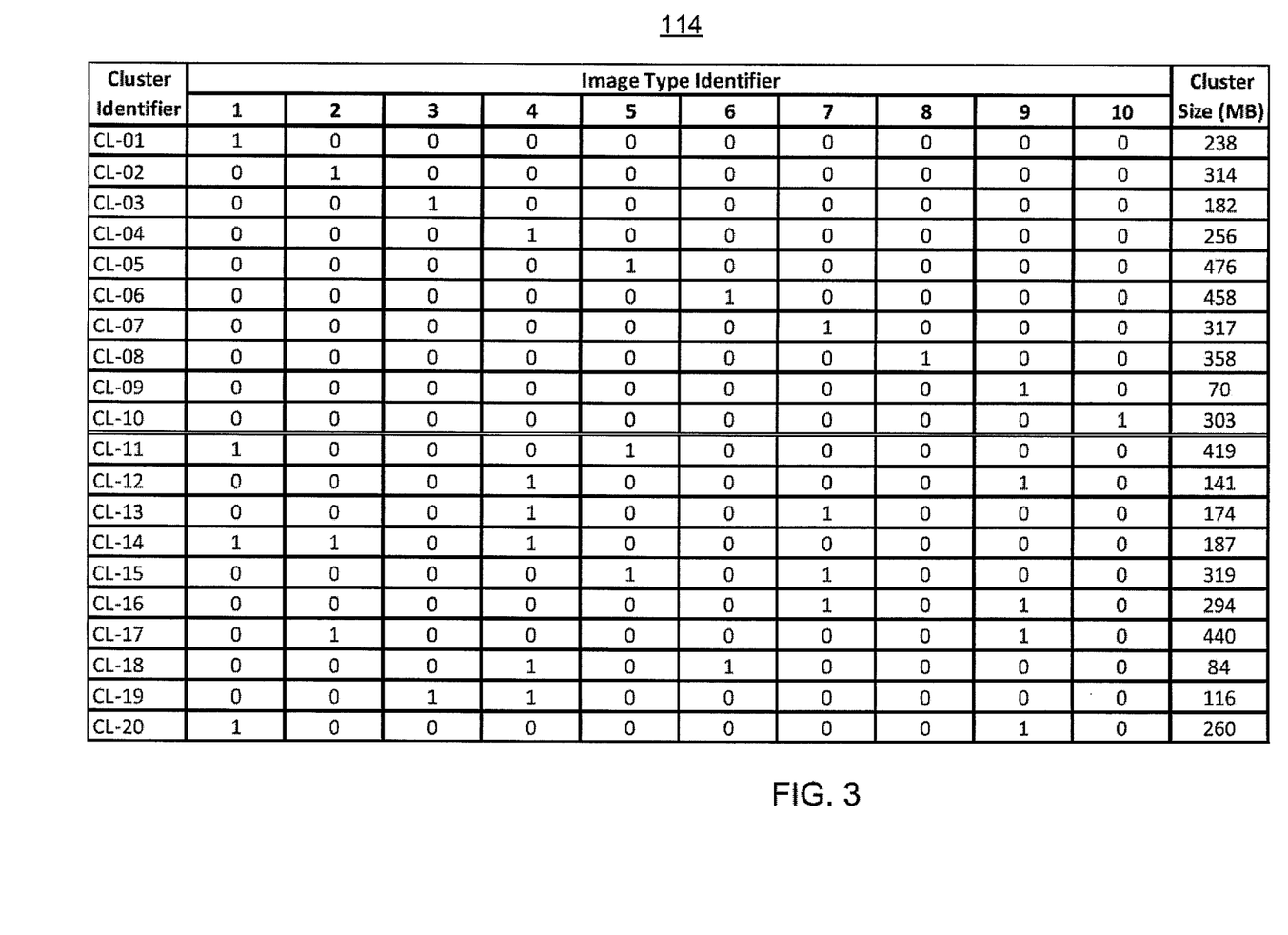
FIG. 3 illustrates an exemplary similarity matrix.

FIG. 3 illustrates an exemplary similarity matrix 114. As illustrated, the similarity matrix 114 stores data about images and clusters stored on a hypervisor. As used herein, a "cluster" refers to a portion of an image; an image is thus made up of one or more clusters. Clusters may vary in size. Moreover, the same cluster may appear in multiple different images.

For instance, the similarity matrix 114 includes a column that lists a plurality of exemplary clusters according to their cluster identifiers (C1-01-CL-20). Along the row for each cluster identifier, the images containing the associated cluster are identified by their image type identifiers (1-10). A zero at the intersection of a cluster identifier and an image type identifier indicates that the corresponding image does not contain the corresponding cluster (e.g., image 1 does not contain cluster CL-02, among others); a one at the intersection of a cluster identifier and an image type identifier indicates that the corresponding image does contain the corresponding cluster (e.g., image 1 does contain cluster CL-01, among others).

In FIG. 3, clusters CL-01-CL-10 are referred to as "singletons." Singleton clusters are clusters that occur in only a single image. By contrast, clusters CL-11-CL-20 each occur in multiple images.

Figure 4:
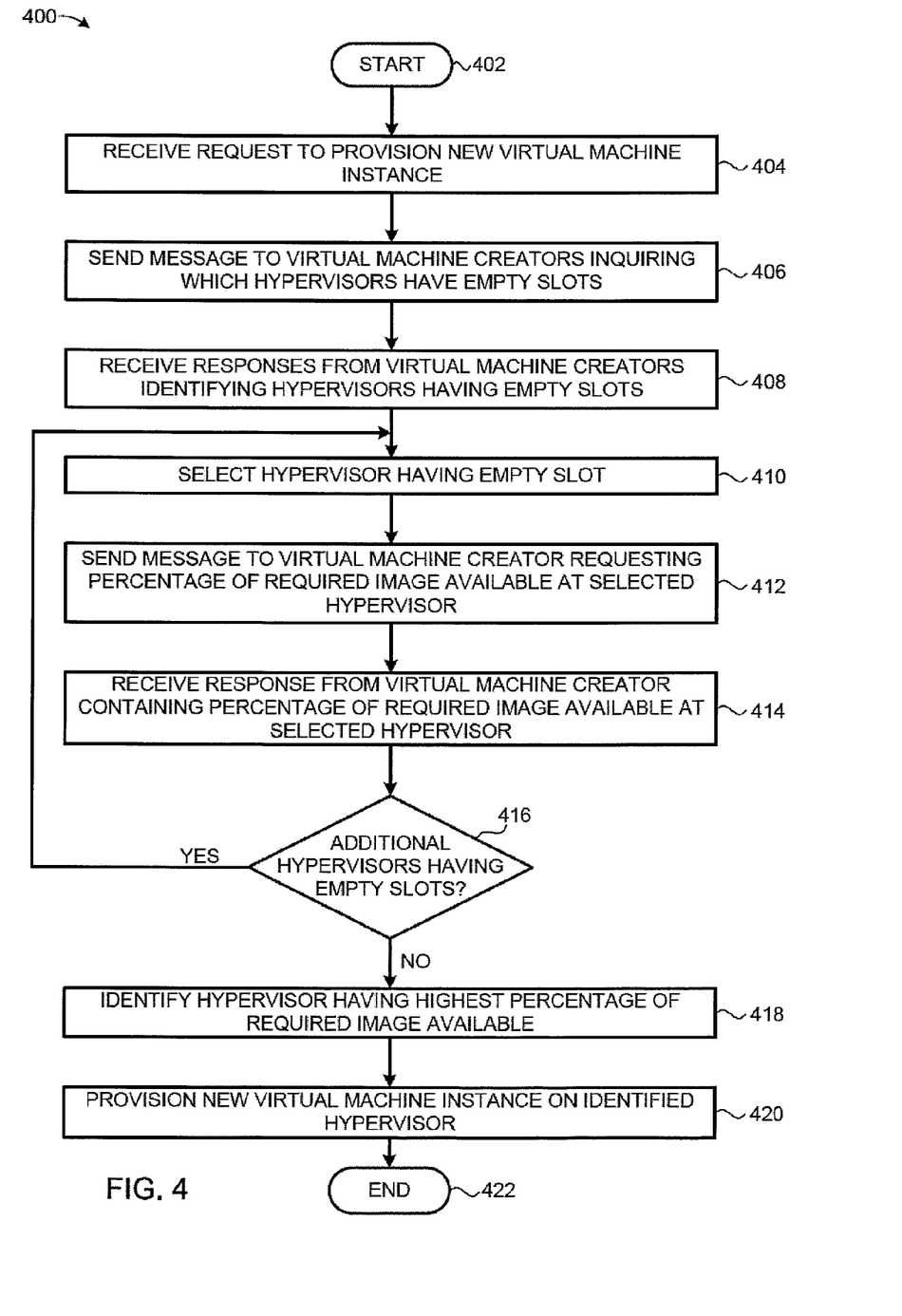
FIG. 4 is a flow diagram illustrating one embodiment of a method for selecting a provisioning target for a new virtual machine instance, according to embodiments of the present invention.

FIG. 4 is a flow diagram illustrating one embodiment of a method 400 for selecting a provisioning target for a new virtual machine instance, according to embodiments of the present invention. In one embodiment, the method 400 may be performed by the provisioning manager 102 or a general purpose computing device as illustrated in FIG. 1 and discussed below.

The method 400 begins in step 402. In step 404, the provisioning manager 102 receives a request to provision a new virtual machine instance.

In step 406, the provisioning manager 102 sends a message to the virtual machine creators 112 of each hypervisor 104 to inquire which of the hypervisors 104 have empty slots that can accommodate the new virtual machine instance. In step 408, the provisioning manager 102 receives a plurality of responses from the virtual machine creators 112 indicating which of the hypervisors 104 have empty slots.

In step 410, the provisioning manager 102 selects a hypervisor 104 having an empty slot. In step 412, the provisioning manager 102 sends a message to the virtual machine creator 112 of the selected hypervisor 104 requesting the percentage of the required image (i.e., the image required for the new virtual machine instance) that is available locally at the selected hypervisor 104 (e.g., via the direct attached storage 110). In one embodiment, this percentage is based on the number of clusters occurring in the required image that are shared by images of virtual machine instances already running on the selected hypervisor 104.

In step 414, the provisioning manager 102 receives a response from the virtual machine creator 112 containing the percentage of the required image that is available locally at the selected hypervisor 104. The provisioning manager 102 then determines, in step 416, whether there are any additional hypervisors 104 having empty slots that have not yet been contacted to determine what percentage of the required image they store locally.

If the provisioning manager 102 concludes in step 416 that there are additional hypervisors 104 having empty slots that have not yet been contacted, then the method 400 returns to step 410 and proceeds as described above with the provisioning manager selecting a next hypervisor 104 having an empty slot.

Alternatively, if the provisioning manager 102 concludes in step 416 that all of the hypervisors 104 having empty slots have been contacted, then the method 400 proceeds to step 418, and the provisioning manager 102 identifies the hypervisor 104 having the highest percentage of the required image available locally. The provisioning manager then provisions the new virtual machine instance on the identified hypervisor in step 420. The method 400 ends in step 422.

Figure 5:
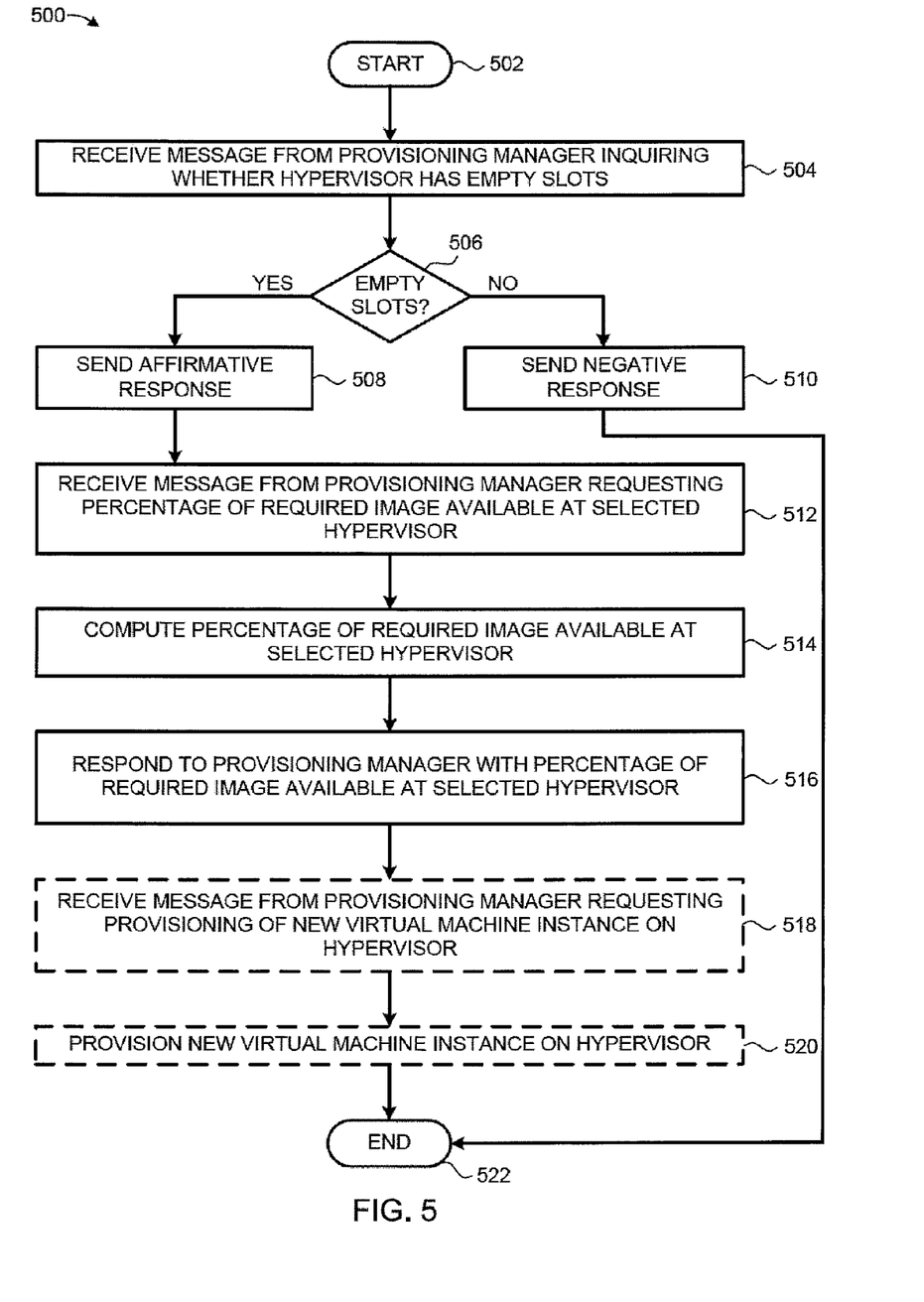
FIG. 5 is a flow diagram illustrating one embodiment of a method for provisioning a new virtual machine instance, according to embodiments of the present invention

FIG. 5 is a flow diagram illustrating one embodiment of a method 500 for provisioning a new virtual machine instance, according to embodiments of the present invention. In one embodiment, the method 500 may be performed by the virtual machine creator 112 of a hypervisor 104 or a general purpose computing device as illustrated in FIG. 2 and discussed below.

The method 500 begins in step 502. In step 504, the virtual machine creator 112 receives a message from the provisioning manager 102 inquiring whether the hypervisor 104 has any empty slots that can accommodate a new virtual machine instance. In step 506, the virtual machine creator 112 determines whether the hypervisor 104 has any empty slots.

If the virtual machine creator 112 concludes in step 506 that the hypervisor 104 does not have an empty slot, then the virtual machine creator 112 sends a negative response to the provisioning manager 102 in step 510. The method 500 then ends in step 522.

Alternatively, if the virtual machine creator 112 concludes in step 506 that the hypervisor 104 does have an empty slot, then the virtual machine creator 112 sends an affirmative response to the provisioning manager 102 in step 508.

In step 512, the virtual machine creator 112 receives a message from the provisioning manager 102 requesting the percentage of the required image (i.e., the image required for the new virtual machine instance) that is available locally at the hypervisor 104 (e.g., via the direct attached storage 110).

In step 514, the virtual machine creator 112 computes the percentage of the required image that is available locally at the hypervisor 104. As discussed above, in one embodiment, this percentage is based on the number of clusters occurring in the required image that are shared by images of virtual machine instances already running on the hypervisor 104. In one embodiment, the virtual machine creator 112 consults the similarity matrix 114 for the data necessary to compute the percentage. In step 516, the virtual machine creator 112 sends a response to the provisioning manager 102 including the computed percentage.

In optional step 518 (illustrated in phantom in FIG. 5), the virtual machine creator 112 receives a message from the provisioning manager 102 requesting that the new virtual machine instance be provisioned on the hypervisor 104. The virtual machine creator 112 then provisions the new virtual machine instance on the hypervisor 104 in optional step 520 (illustrated in phantom in FIG. 5). In one embodiment, provisioning the new virtual machine instance includes using images or clusters that are available locally on the hypervisor (e.g., in the direct attached storage 110). In a further embodiment, the locally available images or clusters provide only a portion of the required image, and any images or clusters that are not available locally are obtained from remote storage (e.g., the storage server 106) to complete the required image. The method 500 ends in step 522.

The invention disclosed herein thus minimizes provisioning time and resource usage by selecting target host machines based at least in part on image redundancy. By constructing the required image for the new virtual machine using as much locally stored data as possible, the amount of data that must be copied over the network can be significantly reduced.

Figure 6:
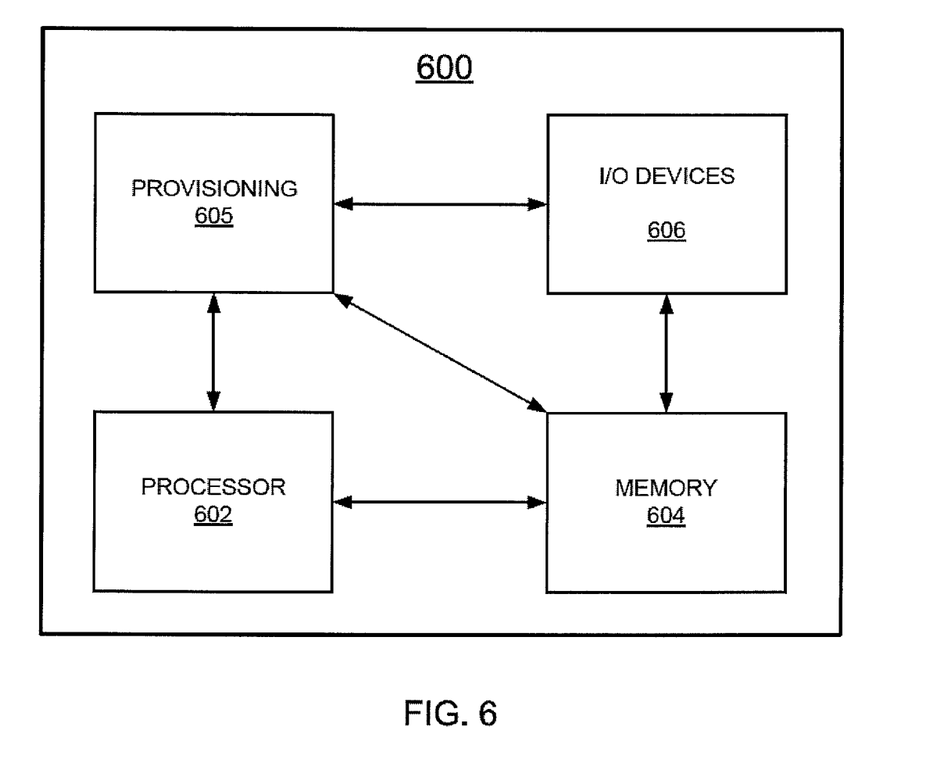
FIG. 6 is a high-level block diagram of the provisioning method that is implemented using a general purpose computing device.

FIG. 6 is a high-level block diagram of the provisioning method that is implemented using a general purpose computing device 600. In one embodiment, a general purpose computing device 300 comprises a processor 602, a memory 604, a provisioning module 605 and various input/output (I/O) devices 606 such as a display, a keyboard, a mouse, a stylus, a wireless network access card, an Ethernet interface, and the like. In one embodiment, at least one I/O device is a storage device (e.g., a disk drive, an optical disk drive, a floppy disk drive). It should be understood that the provisioning module 605 can be implemented as a physical device or subsystem that is coupled to a processor through a communication channel.

Alternatively, the provisioning module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Thus, in one embodiment, the provisioning module 605 for provisioning new virtual machine instances, as described herein with reference to the preceding figures, can be stored on a tangible or physical computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for provisioning a new virtual machine instance, the method comprising:

receiving, at a host machine, a first message from a remote processor, wherein the first message includes an inquiry into whether the host machine has an empty slot available to host the new virtual machine instance, wherein the empty slot comprises a number of cores and a number of memories to be allocated to the new virtual machine instance;

sending, by the host machine, a first response message to the remote processor indicating an availability of at least one empty slot;

receiving, by the host machine, a second message from the remote processor, wherein the second message includes an inquiry into a percentage of an image of the new virtual machine instance available in local storage on the host machine, wherein the image comprises a plurality of clusters;

calculating, by the host machine, the percentage of the image of the new virtual machine instance available in a local storage of the host machine, wherein the calculating utilizes a consultation to a similarity matrix stored on the host machine, the similarity matrix comprising:

a plurality of rows, each of the plurality of rows corresponding to a given cluster of the plurality of clusters;

a plurality of columns, each of the plurality of columns corresponding to a given image of the each image; and at each intersection of one of the plurality of rows and one of the plurality of columns, an indicator indicating whether the given cluster occurs in the given image;

sending, by the host machine, a second response message to the remote processor, the second response message indicating the percentage of the image of the new virtual machine instance available in local storage on the host machine;

receiving, by the host machine, a third message from the remote processor, the third message instructing the host machine to run the new virtual machine instance; and provisioning, by the host machine, the new virtual machine instance based on the percentage of the image of the new virtual machine instance available.

2. The method of claim 1, wherein the calculating comprises:

determining a number of the plurality of clusters that are available in the local storage.

3. The method of claim 1, wherein the provisioning comprises:

constructing a first portion of the image of the new virtual machine instance using one or more clusters retrieved from the local storage.

4. The method of claim 3, wherein the provisioning further comprises:

constructing at second portion of the image of the new virtual machine instance using one or more clusters retrieved from a remote storage.

5. The method of claim 1, wherein the similarity matrix further identifies a file size for each of the plurality of clusters.

6. The method of claim 1, wherein the similarity matrix is updated periodically.

7. The method of claim 1, wherein the similarity matrix is updated on demand.

8. The method of claim 1, wherein the similarity matrix is updated in response to a change in the local storage.

9. The method of claim 1, wherein at least two of the plurality of clusters have different file sizes.

10. The method of claim 1, wherein the indicator is a zero when the given cluster does not appear in the given image, and the indicator is a one when the given cluster does appear in the given image.

11. An apparatus comprising a non-transitory computer readable storage medium containing an executable program for provisioning a new virtual machine instance on a host machine, where the program performs steps on the host machine comprising:

receiving a first message from a remote processor, wherein the first message includes an inquiry into whether the host machine has an empty slot available to host the new virtual machine instance, wherein the empty slot comprises a number of cores and a number of memories to be allocated to the new virtual machine instance;

sending a first response message to the remote processor indicating an availability of at least one empty slot;

receiving a second message from the remote processor, wherein the second message includes an inquiry into a percentage of an image of the new virtual machine instance available in local storage on the host machine, wherein the image comprises a plurality of clusters;

calculating the percentage of the image of the new virtual machine instance available in a local storage of the host machine, wherein the calculating utilizes a consultation to a similarity matrix stored on the host machine, the similarity matrix comprising:

a plurality of rows, each of the plurality of rows corresponding to a given cluster of the plurality of clusters;

a plurality of columns, each of the plurality of columns corresponding to a given image of the each image; and at each intersection of one of the plurality of rows and one of the plurality of columns, an indicator indicating whether the given cluster occurs in the given image;

sending a second response message to the remote processor, the second response message indicating the percentage of the image of the new virtual machine instance available in local storage on the host machine;

receiving a third message from the remote processor, the third message instructing the host machine to run the new virtual machine instance; and provisioning the new virtual machine instance based on the percentage of the image of the new virtual machine instance available.

12. The apparatus of claim 11, wherein the calculating comprises:

determining a number of the plurality of clusters that are available in the local storage.

13. The apparatus of claim 11, wherein the provisioning comprises:

constructing a first portion of the image of the new virtual machine instance using one or more clusters retrieved from the local storage.

14. The apparatus of claim 13, wherein the provisioning further comprises:

constructing at second portion of the image of the new virtual machine instance using one or more clusters retrieved from a remote storage.

15. The apparatus of claim 11, wherein the similarity matrix further identifies a file size for each of the plurality of clusters.

16. The apparatus of claim 11, wherein the similarity matrix is updated periodically.

17. The apparatus of claim 11, wherein the similarity matrix is updated on demand.

18. The apparatus of claim 11, wherein the similarity matrix is updated in response to a change in the local storage.

* * * * *